United States Patent

Bartlett

[15] 3,660,692

[45] May 2, 1972

[54] ELECTRONIC INTERVAL TIMER

[72] Inventor: Peter G. Bartlett, Davenport, Iowa

[73] Assignee: Struthers-Dunn, Inc., Pitman, N.J.

[22] Filed: Nov. 9, 1970

[21] Appl. No.: 88,014

[52] U.S. Cl. ..............................307/293, 307/227, 307/246, 307/273, 328/67, 328/207

[51] Int. Cl. ..............................H03k 17/28

[58] Field of Search ..............................307/227, 246, 273, 293; 328/66, 67, 207

[56] References Cited

UNITED STATES PATENTS

| | | | |
|---|---|---|---|
| 3,320,440 | 5/1967 | Reed | 307/273 X |
| 3,258,605 | 6/1966 | Clark | 307/273 X |
| 3,105,158 | 9/1963 | Nichols | 307/246 X |
| 3,158,757 | 11/1964 | Rywak | 307/293 X |
| 3,426,218 | 2/1969 | Baynard, Jr. | 307/273 X |
| 3,456,554 | 7/1969 | Goodwin | 307/273 X |
| 3,508,083 | 4/1970 | Stern | 307/273 X |

*Primary Examiner*—John S. Heyman
*Assistant Examiner*—R. C. Woodbridge
*Attorney*—William D. Hall, Elliott I. Pollock, Fred C. Philpitt, George Vande Sande, Charles F. Steininger and Robert R. Priddy

[57] ABSTRACT

An electronic interval timer employing integrated circuits and providing a high degree of accuracy in timing. The timer comprises a first timing circuit which demarcates the preselected interval to be timed, and a second short-term interval timer which times successive short, fixed intervals each of which is a submultiple of the preselected interval. Clock pulses are applied to the short-term timer, and each such clock pulse causes it to go through its short-term timing operation. A timing capacitor included in the first timing circuit undergoes a change in the amount of charge stored thereon only during each interval timed by the second timer. Consequently, a predetermined number of successive operations by the second timer must occur to vary the charge on said capacitor from a preselected initial amount to a predetermined final level representative of the completion of timing. Since the frequency of operation of the short-term timer is controlled by the clock pulses, a very high degree of timing accuracy is obtained. The timer includes means which ensures that the change in the amount of charge on the short-term timer is always the same, even for substantial variations in temperature and supply voltage. Provision is made for re-setting the timer at any time and also for interrupting the timing in such a manner that the amount of time already demarcated by the timer is stored and only the remainder of the pre-set interval is timed when timing is once again initiated.

8 Claims, 2 Drawing Figures

PATENTED MAY 2 1972

3,660,692

INVENTOR

Peter G. Bartlett

BY Hall, Pollock + Vande Sande

ATTORNEY

ELECTRONIC INTERVAL TIMER

BACKGROUND OF THE INVENTION

Electronic timing circuits are used in a great variety of applications. Thus, they may be used in process control systems, computers, radar sets, etc. Originally, electronic timers employed vacuum tubes, but of course in recent years many different types of timing circuits using solid-state components have been devised. With the more recent advent of integrated circuits, it has become desireable to provide electronic timers which make use of integrated circuits, thereby providing economies in the construction of electronic timers and also increased reliability. A further advantage is the considerable reduction in space which comes about when integrated circuits are employed.

SUMMARY OF THE INVENTION

The present invention relates to an electronic interval timer using integrated circuits. In particular, the electronic timer of this invention uses NAND logic integrated circuits to provide a large variety of functions. The timer is so designed, moreover, that it is capable of timing a pre-set interval very accurately and with a high degree of reliability. The use of integrated circuits makes possible the construction of a timer according to this invention at low cost and using only a very small amount of space.

Described briefly, the electronic timer of this invention comprises two electronic timing circuits, each employing a capacitor charging and discharging circuit. A first of these timers, which may be considered a long-term timing circuit, times the actual interval which is to be demarcated by the timing circuit, whereas the short-term timer demarcates a succession of short intervals of predetermined duration and constituting a submultiple of the time interval demarcated by the long-interval timer. Thus, each short-term interval is of fixed duration, and during the demarcation of each short-term interval, a predetermined decrement of charge is discharged from the capacitor associated with the long-term interval timer. The repetition rate of the short-term timer is governed by the frequency of clock pulses applied thereto and may be thus very accurately stabilized, particularly when the short-term interval timer is triggered by clock pulses obtained from the power source such as the common 60-cycle a.c. source. Since the same predetermined change in the amount of charge on the timing capacitor takes place in response to each operation of the short-term timer, it can be seen that a prescribed change in the charge on such capacitor, from a preselected initial value to a second value at which an indication output is obtained, will necessarily correspond to a certain number of the clock pulses and thus to a definite timer period.

As indicated above, throughout each interval timed by the short-term interval timer, decrements of charge are taken from the timing capacitors for both the timing circuits. Preferably, both timing circuits are identical except for a difference in size of the two timing capacitors, the timing capacitor for the long-interval timer being, of course, of substantially greater capacitance than the timing capacitor for the short-interval timer. In one specific embodiment of the invention, the ratio of the capacitances of the two timing capacitors was approximately 1,000 to 1. Since the timing circuits are otherwise identical, and since the circuit organization is such that discharging of both capacitors occurs only throughout the time that the short-term interval timer is in its timing condition, it can be seen that whatever decrement of charge is taken from the short-term timer's timing capacitor is also subtracted from the timing capacitor of the long-term interval timing. Assuming that the same reference voltage is applied to corresponding terminals of each of the two timing capacitors, then whatever decrement of charge must be discharged from the capacitor of the short-term timer in order for it to time out, N times that amount of charge must be discharged in increments from the capacitor for the long-term timer in order that it shall be able to time out, where N is the ratio of the capacitances of the two timing capacitors.

In the preferred embodiment, the timing interval demarcated by the short-term timer is of a preselected, fixed duration, and thus the amount of charge added to each timing capacitor is always the same for each interval demarcated by the short-term timer. Adjustment of the preselected interval to be timed by the timer of the invention is provided by varying the voltage initially applied to the timing capacitor of the long-term timer so that it is a predetermined proportion of that which is applied to the capacitor for the short-term timer. In this way, the number of cycles of the short-term timer that must occur before sufficient charge has been placed on the capacitor for the long-term timer to cause that timer to time out will be correspondingly reduced, thereby shortening the interval which is timed.

It is a feature of this invention that both the short-term and long-term timers shall be of identical construction throughout except for the difference in magnitude of capacitance of the two timing capacitors, both capacitors otherwise being of the same type. Also, charging currents for the capacitors are derived from the same constant current source. As a result, the relationship of the intervals timed by the two timing circuits is a function only of the relative capacitances of the two timing capacitors and substantially independent of other factors. Thus, a variation in supply voltage or of the level of current supplied by the constant current source will not appreciably affect the duration of the timed interval. Similarly, variations in circuit parameters resulting from temperature variations will also not substantially affect the duration and accuracy of timing. Thus, a variation in temperature causing the capacitances of both timing capacitors to drift in value will still not affect the duration of the timed interval.

Another characteristic of the timing circuit of this invention is its provision for providing a plurality of different outputs for different purposes, the ability to re-set the timer by applying an appropriate input to a separate terminal thereof, and ability to terminate the timing and start it again in response to a still different input control.

DETAILED DESCRIPTION OF THE PREFERRED EMBODIMENT

Figures 1, 2:
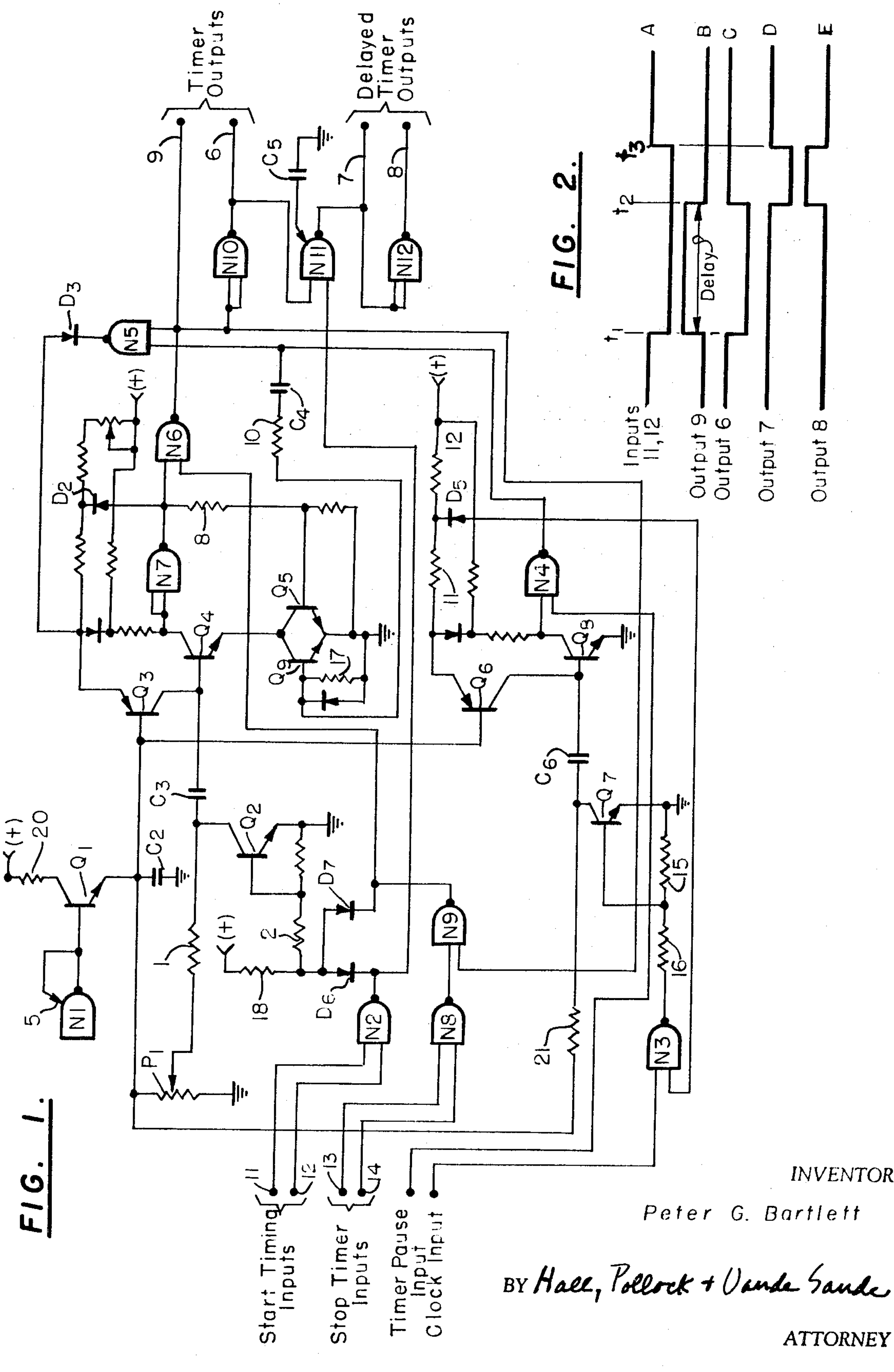
FIG. 1 is a circuit diagram illustrating a preferred embodiment of the electronic interval timer of this invention.
FIG. 2 is a waveform diagram illustrating the several different kinds of inputs and outputs that are available from the timer of FIG. 1.

The electronic timer of FIG. 1 comprises, in general terms, a long-term timing circuit which includes transistors Q2 and Q4 which are interconnected to operate, in effect, as a one-shot multivibrator. The two transistors Q7 and Q8 are similarly interconnected to operate, in effect, as a one-shot multivibrator, and preferably the transistors Q7 and Q8 are identical, respectively, to the transistors Q2 and Q4; and all other circuit components affecting the timing operation of these two circuits are similarly identical with the exception, however, of their respective timing capacitors C3 and C6. Capacitor C3 is much larger than the capacitor C6 in terms of its capacitance value, being perhaps different by a factor of 1,000 to 1.

Transistor Q1 is included in a constant voltage source which further includes resistor 20 connected between the collector of transistor Q1 and the (+) voltage source. The base of transistor Q1 is connected to the output of a NAND gate N1 having its expander input 5 connected to its output and thus to the base of transistor Q1. Such expander input connector provides the effect of a Zener diode for establishing a predetermined reference voltage at the emitter output of transistor Q1.

It will be noted that the constant voltage emitter output of transistor Q1 appearing across the stabilizing and filtering capacitor C2 is applied not only to the base of transistor Q3 but also directly to the base of transistor Q6. Transistors Q3 and Q6 are each included in a respective constant current source with each such source serving to control the rate of discharge of a respective timing capacitor C3 or C6.

The amplitude of voltage provided at the emitter output of transistor Q1 is also applied through a resistor 21 to the collector of transistor Q7 and also to the left-hand terminal of timing capacitor C6. The magnitude of this voltage therefore determines the initial magnitude of charge across this timing capacitor. This same level of voltage is also applied across the potentiometer P1 whose bottom terminal is grounded and whose movable tap is connected through resistor 1 to the collector of transistor Q2 and thus also to the left-hand terminal of the timing capacitor C3. When the movable tap on potentiometer P1 is at the uppermost position, the full potential of the voltage available across capacitor C2 is supplied through resistor 1 to the timing capacitor C3 so that this voltage is then exactly identical to the voltage across the timing capacitor C6. Under these circumstances, the ratio of the timed intervals demarcated, respectively, by the long-term timer and the short-term timer is solely dependent upon the relative capacitance values of the two timing capacitors C3 and C6 which may be in the order of 1,000 to 1. Of course, when the tap on potentiometer P1 is moved to a lower position, to lower thereby the voltage initially available at the left-hand terminal of timing capacitor C3, the duration of timing of the long-term timer is reduced so that its timing interval becomes a lower multiple of the timing interval of the short-term timer.

It is believed that the description of the electronic timer of this invention can, from this point on, be best described by referring to its operation. Thus, both the short-term and long-term timers are normally in the condition where the respective transistors Q2 and Q7 are turned off. Both timers are set into operation by applying a momentary positive-going pulse to the base of the respective transistor Q2 or Q7. Such an initiating input for the timer comprising transistors Q2 and Q4 is provided by grounding either Start Timing Input 11 or 12. Both terminals are normally above ground as a result of a circuit connection (not shown) to a voltage source. With both inputs positive, NAND gate N2 provides a zero output. However, the grounding of either of these inputs 11 or 12 causes the NAND gate N2 to supply a positive output which then permits the junction of resistors 2 and 18 to go positive and thereby raise the base voltage of transistor Q2. Normally this junction is clamped to ground through diode D6 because of the zero output from gate N2. The increase of voltage at the base of transistor Q2 turns on this transistor, simultaneously turning off transistor Q4 as a result of the fact that the voltage at the collector of transistor Q2 goes suddenly to ground as the transistor is turned on. The initially charged timing capacitor C3, which is charged to a level of voltage dependent upon the setting of the tap on potentiometer P1, now begins to discharge through transistors Q2 and Q3.

At about the same time, the short-time interval timer comprising transistors Q7 and Q8 is triggered by an input clock pulse which is applied to an input terminal of NAND gate N3. When this NAND gate input goes to zero in response to a pulse applied to the Clock Input terminal, the junction of resistors 15 and 16 goes momentarily positive. Normally, this Clock Input terminal is at a positive potential as is also the second input to gate N3 which is obtained through diode D5 from the junction of resistors 11 and 12. The output of gate N3 normally, therefore, provides a zero output. The positive output pulse appearing at the output of gate N3 in response to the clock pulse is applied to the base of transistor Q7 and triggers a timing operation of the multivibrator comprising transistors Q7 and Q8 so that capacitor C6 starts to discharge. The discharging current passes into the collector of transistor Q6, which transistor is identical to the corresponding transistor Q3 associated with the long-term timer, and it will be noted that the bases of both these transistors are connected to the upper terminal of capacitor C2 so that both have identical base voltages and therefore both provide substantially the same level of charging current for controlling the linear discharging of the respective timing capacitors C3 and C6.

The timing operation of the short-term timer as measured by the discharge time of capacitor C6 is very short, substantially less than the period of the clock pulses, and when it is terminated, the multivibrator of transistors Q7 and Q8 reverses its state so that transistor Q8 turns on again and its collector goes negative. Normally, the Timer Pause Input terminal is maintained positive by an external connection (not shown) to the power source; consequently, with both inputs positive, the output of gate N4 is at zero so that when the collector of Q8 goes negative, the output of gate N4 must go positive. This provides a positive input to NAND gate N5, which then must go to zero since the output of gate N6 is now positive as will subsequently be shown. This zero output of gate N6 is now effective through diode D3 to clamp the emitter of transistor Q3 to ground and thereby prevent it from providing further charging current for timing capacitor C3. It can thus be seen, from the foregoing description, that capacitor C3 can discharge only during each successive timing operation involving the short-term timer and that, as soon as the short-term interval timer has timed out, transistor Q3 which provides a constant current source for capacitor C3 is turned off so that the charge across the timing capacitor C3 cannot again be changed until the short-term timer is again triggered by the application of a further clock input to NAND gate N3.

Before describing the various additional features of the timer, it is believed desirable to describe how the various output terminals are affected during a timing operation. This is shown in FIG. 2, where line A shows a typical input which may be applied to either input terminal 11 or 12. Thus, normally both inputs 11 and 12 are at a positive potential, and the characteristics of a NAND gate such as gate N2 are such that its output will be zero when it has a positive voltage on both of its input terminals. However, at time $t_1$, as shown in FIG. 2, either or both the input terminals 11 and 12 goes to zero, and this causes the output of NAND gate N2 to go positive, thereby triggering the timing action of the long-term timer as previously described.

Initially, the long-term timer comprising transistors Q2 and Q4 is in the condition wherein transistor Q2 is turned off and transistor Q4 is turned on. Therefore, the collector of transistor Q4 is at a low potential so that both inputs of the NAND gate N7 are zero so that this NAND gate provides a plus for an output. One input of NAND gate N6 is therefore positive, and the other input of this gate is connected to the output of gate N9 which is now also at a positive potential, as will later be shown, so that the output of gate N6 is zero. Accordingly, output 9 is normally at zero as indicated at line B of FIG. 2.

At time $t_1$, when the status of the transistors Q2 and Q4 is reversed so that transistor Q4 becomes non-conductive, the voltage at the collector of transistor Q4 rises above ground so that the output of NAND gate N7 goes to zero, and this causes the output of gate N6 to go positive as is also shown in FIG. 2. This condition persists until the end of the predetermined interval at $t_2$ when transistor Q4 again turns on so that output terminal 9 will again go to zero. The time interval between these two occurrences is the delay time of the timer as indicated at line B of FIG. 2.

The output of gate N6 is also applied as an input to both input terminals of a further NAND gate N10 which thus inverts the output of NAND gate N6 and provides that the voltage at timer output terminal 6 will be the exact inverse of that which appears at terminal 9. This condition is shown at line C of FIG. 2.

With respect to the Delayed Timer Output terminal 7, this output is obtained from NAND gate N11 which receives one input from the output of NAND gate N2 and a second input corresponding to the signal appearing at Timer Output 6. When the timer is in its non-timing state, both Start Timing Inputs 11 and 12 are positive so that gate N2 provides a zero output with the result that one input of gate N11 is therefore zero during the non-timing interval. Consequently, throughout any such time, gate N11 must provide a positive output, and this is shown at line D of FIG. 2. At the initiation of timing, either or both of the Start Timing Inputs 11 or 12 goes to zero, as previously described, and the output of gate N2 then goes positive. At the same time, however, the output of gate N10 goes to zero, as shown at line C of FIG. 2, and therefore only one input terminal of gate N11 is positive and the other zero, with the result that the output of gate N11 at output terminal 7 then must remain positive as shown at line D of FIG. 2. The expander input of gate N11 is connected through a capacitor C5 to ground to ensure that the output of gate N11 will remain positive during the switchover time of the two inputs to this gate.

Upon the termination of the timed interval, the output of gate N10 goes positive (see line C, FIG. 2), and assuming that one or the other of input terminals 11 and 12 is still at zero, the other input to gate N11 will be positive as well. With both of its input positive, gate N11 will provide a zero output at terminal 7 as shown at line D of FIG. 2, and this condition will persist as long as either of the inputs 11 or 12 remains at zero. However, when both terminals 11 and 12 again go positive as indicated at time $t_3$ in FIG. 2, the output on output terminal 7 will go positive again to its normal state as shown at line D.

The output signal on terminal 7 is applied to both input terminals of NAND gate N12 so that the output of this gate at output terminal 8 is the inverse of the signal appearing at output terminal 7, and this output is as shown then at line E of FIG. 2.

It has been previously mentioned that under the normal, non-timing condition of the circuit, transistor Q4 is turned on. This is possible even though the emitter circuit of this transistor is connected through both transistors Q9 and Q5 in parallel to ground because transistor Q5 is normally turned on. This results from the fact that the base of this transistor Q5 is connected through resistor 8 to the output of gate N7. Thus, when transistor Q4 is turned on, its collector voltage is at zero, and with both inputs of NAND gate N7 at zero, a positive output is provided which then biases transistor Q5 to the ON condition.

Upon the initiation of timing, however, transistor Q4 is turned off as already described, and this results in a zero output from NAND gate N7 so that transistor Q5 is turned off at this time as well. With respect to the parallel-connected transistor Q9, its base is connected through resistor 17 to ground, and also through resistor 10 and capacitor C4 to the output of NAND gate N4. Therefore, transistor Q9 is now also turned off.

During the timing operation, the multivibrator comprising transistors Q7 and Q8 is operated periodically, once in response to each clock pulse, and each such operation results in a decrement of charge on capacitor C3. The aforesaid operation continues repeatedly until such time that the charge on capacitor C3 has reduced to a level which will permit a reversal in states once again of transistors Q2 and Q4. This condition cannot occur by itself, however, because of the two non-conductive transistors Q5 and Q9 in the emitter circuit of transistor Q4. However, upon each termination of timing of the short-term timer, when transistor Q8 is restored to its ON condition, the negative-going voltage variation at the collector of Q8 causes the output of gate N4 to go positive, and this produces a positive-going trigger pulse through capacitor C4 which then appears on the base of transistor Q9. Transistor Q9 is then turned on momentarily, with its ON time being perhaps only a one-half microsecond or so, and if transistor Q4 is then capable of conducting, it will then conduct, and the resulting drop of its collector voltage will produce a positive output from gate N7 which will then result in the turning on of transistor Q5 which will then provide a conductive path for the emitter current of transistor Q4. Transistor Q4 will then stay on, and it should be noticed that the positive output from gate N7 is then also effective through diode D2 to provide a positive bias for the emitter of transistor Q3 so that the constant current source including transistor Q3 is now effective to provide a constant current for the charging of capacitor C3.

The foregoing operation may be summarized as follows: Normally, when the timer is not timing, transistor Q4 is on and conduction is through transistor Q5 which is also on because of the positive output voltage obtained from gate N7. Upon the initiation of timing, transistor Q4 turns off and stays off because its positive collector voltage causes gate N7 to drive the base of transistor Q5 to zero, thereby turning off transistor Q5. Eventually, capacitor C3 discharges to a point where the base of transistor Q4 rises sufficiently to permit transistor Q4 to turn on again. Transistor Q4 cannot turn on at this time, however, because both transistors Q9 and Q5 are turned off. However, the very next time that the short-term timer times out, transistor Q9 turns on momentarily and this permits transistor Q4 to turn on also. When this happens, transistor Q5 is turned on and stays on until a further timing operation is initiated.

It is at times desirable that a timing operation, already initiated, be re-set in response to an external signal, and with the timing then continuing in the event that such external signal is removed. This function is provided in the timer of this invention by providing input terminals 13 and 14 and associated circuitry which responds to the presence of a zero voltage upon either of these terminals 13 and 14. More specifically, terminals 13 and 14 are ordinarily both positive as a result of their being connected to a positive source of voltage by an obvious connection (not shown). Under these conditions, the output of gate N8 is zero, and therefore the output of gate N9 must be positive. The input to NAND gate N6 must therefore be positive as well, thereby permitting the output of gate N6, under these circumstances, to always be the inverse of the input signal that it receives from the output of NAND gate N7.

However, if it is assumed that a timing operation is under way, then the grounding of either input terminals 13 or 14 will result in the output of gate N8 going positive, and since the other input gate N9 is obtained from output terminal 9 which, as shown in FIG. 2, line B, is positive at this time, both inputs of gate N9 are now positive so that its output must be at zero. This zero output is effective, through the diode D7, to cause the junction of resistors 18 and 2 to go to ground, thereby turning off transistor Q2 and immediately charging capacitor C3. Concurrently, transistor Q4 is turned off and thus the timer is re-set, in effect, to zero and will remain in this condition as long as the grounding input is applied to either of the Stop Timer Input terminals 13 or 14.

It is of course important that such a pause in the timing operation shall not produce an output from the Timer Output terminals 9, 6, 7, and 8 since associated circuitry will recognize a drop in potential on terminal 9, for example, as the termination of a timing operation. To avoid this situation, the output of gate N9 is also applied as an input to gate N6, and this zero input to gate N6 ensures that the output of gate N6 and thus also Timer Output terminal 9 will remain at a positive voltage level irrespective of what happens during this time at the collector of transistor Q4. Once the Stop Timer input terminals 13 and 14 are both again allowed to go positive, the timing operation can proceed as before.

A further feature of the invention is to provide that the timing operation can be interrupted at any time, but with the timing being permitted to resume at the point where it was terminated. In other words, if it is assumed that the timer of the invention is pre-set to time a 5-second interval, the 5-second interval will start with the application of a ground input signal to either of the Start Timing input terminals 11 or 12. If it is assumed now that 2 seconds of the interval have elapsed, and that a Timer Pause input is now applied, this input will be in the form of a grounding input on this terminal which is normally at a positive level, and this will ensure that the output of NAND gate N4 must then be positive. With this positive output, and with terminal 9 of the timer now also providing a positive output during the timing operation, NAND gate N5 will be receiving two positive inputs, thereby ensuring that its output must be zero. This zero output is effective through diode D3 to clamp the emitter of transistor Q3 to ground thereby cutting off the constant current source for capacitor C3 so that capacitor C3 can then no longer discharge. The capacitor then will retain this state of charge until such time that the Timer Pause input is removed which then permits the emitter of transistor Q3 to once again go positive and turns on the constant current source.

What is claimed is:

1. An electronic interval timer comprising in combination, a first long-term timing circuit for timing a predetermined interval, said timing circuit including a timing capacitor and means for varying the electrical charge across said capacitor from a first predetermined level at the initiation of timing to a second predetermined level at the termination of timing, a second short-term timing circuit for timing a first short interval which is a submultiple of said predetermined interval, means responsive to a succession of clock pulses for initiating timing by said second timer in response to each pulse, said short interval being shorter than the period of said clock pulse, means for varying the charge on said capacitor by a predetermined amount toward said second predetermined level only during each interval timed by said second timing circuit, and means responsive at least in part to the attainment by said capacitor of said second predetermined level of charge for generating an output signal representative of the end of said predetermined interval.

2. The timer of claim 1 in which said second timing circuit also includes a timing capacitor, and first and second charging circuit means for said capacitors associated with both said first and second timing circuits respectively for varying the charge across the respective capacitors by equal amounts throughout each interval timed by both said timing circuits.

3. The timer of claim 2 in which at least one constant current source controls the rate of charge variation on both said timing capacitors for said respective first and second timing circuits.

4. The timer of claim 2 in which one constant current source is electrically coupled to each said timing circuit, said timer further including a constant voltage source for energizing both said constant current sources.

5. The timer of claim 1 in which both said timing circuits include a one-shot multivibrator, said multivibrator of said first timing circuit including a transistor whose conductive status is switched upon the concurrent attainment by said timing capacitor of said second level of charge and the completion of timing by said second timing circuit.

6. The timer of claim 5 in which each of said first and second timing circuits includes a transistor (Q4, Q8) which is rendered non-conductive during the timing operation of the associated timing circuit, said transistor (Q4) for said first timing circuit including in its emitter circuit at least one switch circuit element (Q5, Q9) for at times preventing conduction of said transistor, and means (N4, C4, 10) responsive to the completion of each timing operation by said second timing circuit for rendering said switch elements (Q5) conductive to thereby render said transistor (Q4) conductive provided said capacitor (C3) for said first timing circuit has attained said second level of charge.

7. The timer of claim 1 which further includes means for varying the voltage initially on said timing capacitor during a non-timing interval.

8. The timer of claim 1 which includes an auxiliary input means, and means responsive to the application of a signal to said auxiliary input for prohibiting a variation in charge on said timing capacitor throughout the duration of said signal.

* * * * *